US008890692B1

(12) United States Patent
Lindblad et al.

(10) Patent No.: US 8,890,692 B1
(45) Date of Patent: Nov. 18, 2014

(54) SYSTEMS AND METHODS FOR AIDING IN RECOVERY OF LOST ARTICLES

(75) Inventors: Scott Lindblad, Burnsville, MN (US); David Neuman, Randolph, MN (US)

(73) Assignee: Automated Assembly Corporation, Lakeville, MN (US)

( * ) Notice: Subject to any disclaimer, the term of this patent is extended or adjusted under 35 U.S.C. 154(b) by 399 days.

(21) Appl. No.: 13/289,144

(22) Filed: Nov. 4, 2011

(51) Int. Cl.
*G08B 13/14* (2006.01)

(52) U.S. Cl.
USPC .................................. 340/572.1; 340/539.11

(58) Field of Classification Search
CPC ... G06K 7/10386; G06Q 10/08; G08B 21/18; G08B 21/24; G08B 13/00
USPC ......................................... 340/572.1, 539.11
See application file for complete search history.

(56) References Cited

U.S. PATENT DOCUMENTS

| 6,967,577 | B2 * | 11/2005 | Taylor et al. | 340/572.1 |
|---|---|---|---|---|
| 7,626,505 | B2 * | 12/2009 | August et al. | 340/572.4 |
| 7,780,082 | B2 * | 8/2010 | Handa et al. | 235/446 |
| 2003/0095032 | A1 * | 5/2003 | Hoshino et al. | 340/5.92 |
| 2003/0227382 | A1 * | 12/2003 | Breed | 340/539.13 |
| 2012/0032798 | A1 * | 2/2012 | Caplan et al. | 340/539.32 |

OTHER PUBLICATIONS

EZ-Find, "*EZ-Find! Never Lose Anything Again!*," www.ez-find.com, Feb. 1, 2012.

\* cited by examiner

*Primary Examiner* — Kerri McNally
(74) *Attorney, Agent, or Firm* — Crawford Maunu PLLC

(57) ABSTRACT

Approaches for aiding in recovery of lost articles are disclosed. A computing arrangement is configured with a database that contains article identifiers of a plurality of articles and associated data that identify owners of the articles. A handheld computing device reads an article identifier from an identification tag attached to an article and transmits the article identifier to the computing arrangement. The computing arrangement reads the data associated with the identifier that identifies the owner of the article in response to the identifier received from the handheld computing device and outputs the data that identifies the owner of the device.

24 Claims, 3 Drawing Sheets

SYSTEMS AND METHODS FOR AIDING IN RECOVERY OF LOST ARTICLES

FIELD OF THE INVENTION

One or more embodiments generally relate to a system for aiding in the recovery of lost articles.

BACKGROUND

Matching lost-and-found articles or stolen-and-recovered articles to their rightful owners can sometimes prove challenging. For example, a luggage tag may get separated from the intended luggage or the tag may become illegible over time. Stolen articles often have no owner-identifying markings, which makes return to their rightful owner especially problematic.

SUMMARY

In one embodiment, a system is provided for aiding in the recovery of lost articles. The system includes a computing arrangement that is configured with a database that contains article identifiers of a plurality of articles and associated data that identify owners of the articles. A handheld computing device is configured with instructions that, when executed by the handheld computing device, cause the computing device to read an article identifier from an identification tag attached to an article. The article identifier is transmitted to the computing arrangement, and the computing arrangement, in response to the identifier received from the handheld computing device, reads the data associated with the identifier that identifies the owner of the article. The data that identifies the owner of the device is then output.

In another embodiment, a method is provided for aiding in recovery of lost articles. The method includes reading with a handheld computing device, an article identifier from an identification tag attached to an article. The article identifier is transmitted from the handheld computing device to a computing arrangement. The computing arrangement is configured with a database that contains article identifiers of a plurality of articles and associated data that identify owners of the articles. In response to the article identifier received from the handheld computing device, the computing arrangement reads from the database data that is associated with the article identifier and that identifies the owner of the article. The data that identifies the owner is transmitted from the computing arrangement to the handheld computing device.

A handheld device is provided in another embodiment. The device includes a processor, a memory coupled to the processor, an RFID transceiver coupled to the memory and to the processor, and a communications circuit coupled to the memory and to the processor. The memory is configured with instructions that, when executed by the processor, cause the processor to activate the RFID transceiver to read an article identifier from an RFID tag attached to an article. The article identifier is transmitted to a computing arrangement via the communications circuit. The processor, in response to receiving data that identifies an owner of the article from the computing arrangement, initiates communication with the owner.

In another embodiment, a method of operating a handheld device includes activating an RFID transceiver of the handheld device to read an article identifier from an RFID tag attached to an article. The article identifier is transmitted from the handheld device to a computing arrangement via a communications circuit of the handheld device. In response to receiving data that identifies an owner of the article from the computing arrangement, the handheld device initiates communication with the owner.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION OF THE DRAWINGS

In accordance with one or more embodiments, a system is provided for aiding in the recovery of lost-and-found or stolen-and-recovered articles. A computing arrangement is configured with a database that contains article identifiers of a plurality of articles and associated data that identify the owners of the articles. A handheld computing device is equipped with an identification (ID) tag reader. The handheld device reads an article identifier from an ID tag that is attached to an article of interest. The article may be lost-and-found luggage at an airport, a lost-and-found article at an event (e.g., concert or sport) center, or property recovered by a police department, for example. The handheld device is configured to read an article identifier from an ID tag attached to an article in response to a user-initiated control. The article identifier is transmitted by the handheld device to the computing arrangement. The computing arrangement, in response to the identifier received from the handheld computing device, reads the data that is associated with the identifier and that identifies the owner of the article. The identifying data is then output so that the owner of the device can be contacted.

Rather than storing the owner information on the RFID tag, the embodiments of the invention store the data that identify owners of articles in a separate database. This provides an added level of protection for the owners against becoming the target of fraud or malice by the finder of the article if the finder happens not to be a trustworthy entity. For example, entities such as airlines or police departments may generally be trusted in handling found or recovered articles. However, there is uncertainty associated with articles found or recovered and under the control of unknown individuals.

Figure 1:
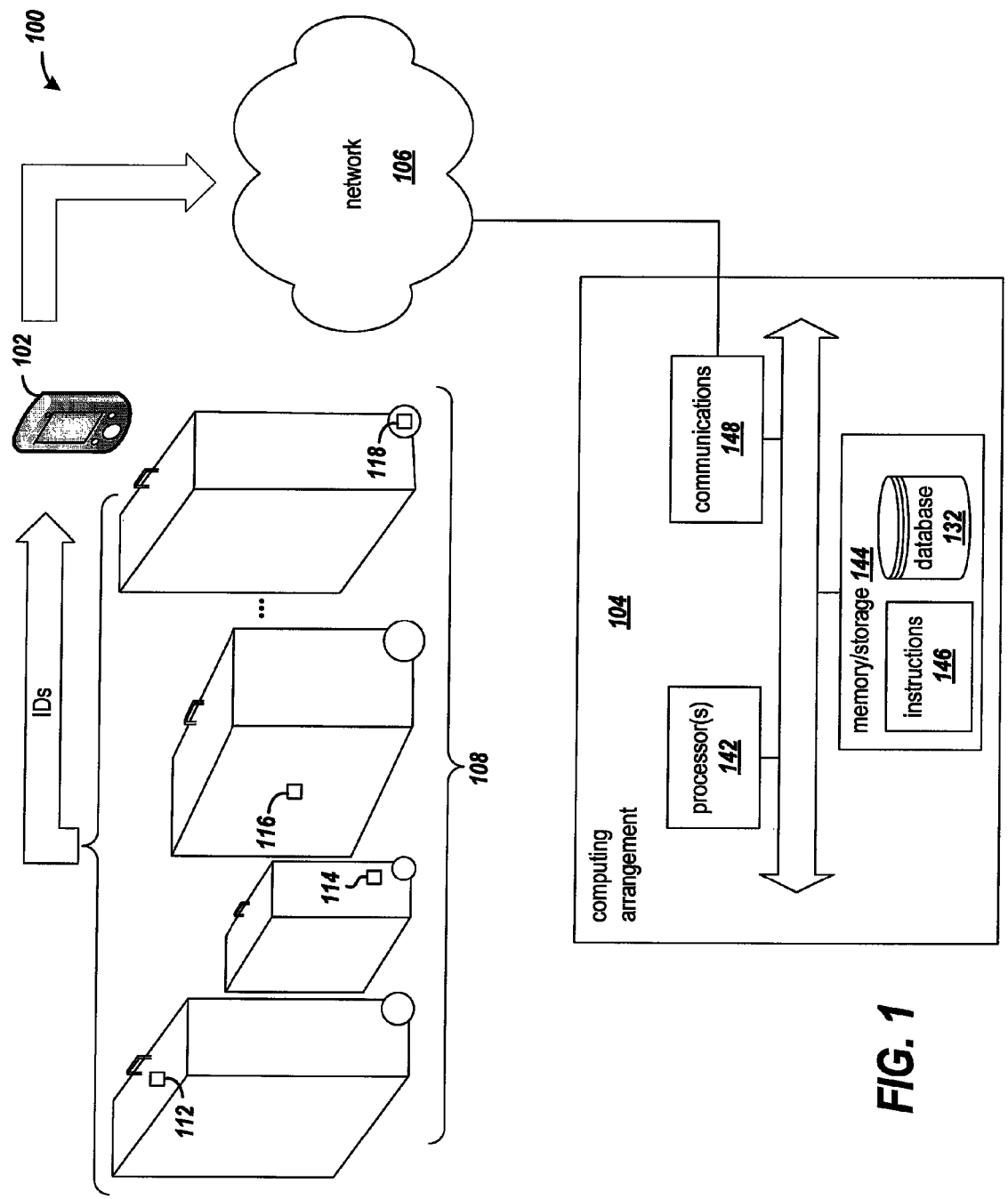
FIG. 1 is a diagram of a system for identifying the owners of recovered articles using ID tags attached to the articles and communicating with the owners of those articles.

FIG. 1 is a diagram of a system 100 for identifying the owners of recovered articles using ID tags and communicating with the owners of those articles. The system generally includes a handheld computing device 102 that is equipped to read identification tags, along with a computing arrangement 104 that implements a lost-and-found repository. The handheld device and the computing arrangement are coupled via network 106.

The handheld device 102 may be a handheld reader dedicated to reading ID tags or a suitably configured electronic tablet, smart phone etc. The handheld device reads the identifiers from identification tags that are attached to one or more articles, such as articles 108. The example articles 108 include luggage having identification tags 112, 114, 116, and 118 attached at various locations. Though luggage is illustrated, it will be appreciated that other tagged articles may include bicycles, motor vehicles, clothing, consumer electronics, recreational and sporting equipment, etc.

In one embodiment, the handheld device 102 includes a barcode reader, and the ID tags are barcodes. In another embodiment, the handheld device 102 includes an RFID reader, and the ID tags are RFID tags. RFID tags are advantageous over barcodes in that an unobstructed line-of-sight is not required between the reader and the ID tag. Thus, with RFID implementations the user need not search for the ID tags on the articles, nor would the user have to move articles to read the ID codes. The RFID tags may be active or passive depending on implementation requirements. For ease of implementation, an RFID system based on 13.56 MHz technology may be preferred. However, for other applications, UHF RFID systems may be feasible.

Each ID tag is configured with a unique article identifier such as an alphanumeric code. In addition, in an RFID tag implementation, the RFID tag may be configured with additional information that may be helpful in distinguishing the tagged article from other tagged articles for which RFIDs may be concurrently read. For example, a luggage cart may contain a number of luggage pieces having RFID tags. If the RFID tags were configured with only numbers, without further information from the owners one could not easily identify which pieces of luggage belonged to which owners once the owners associated with the article identifiers were known. Therefore, in one or more embodiments, each RFID tag may be configured with data that describe the article along with the identifier code. For example, the data that describe the article may include a generic name of the article, a model name or number, color, size, shape, etc. Alternatively, the data that describe the article may be stored in association with the identifier code in the database 132.

The handheld device initiates communication with computing arrangement 104. Different communication channels may be used according to implementation requirements. For example, communication channels encompassed by network 106 may include a Bluetooth connection to a local computer, which then communicates with the computing arrangement 104; a Wifi connection to the Internet; or wireless Internet access as provided by wireless telecommunication companies, for example. To ensure that only authorized parties are permitted access to the owner information available from the computing arrangement, communications may be secured using encryption in combination with digital certificates.

The computing arrangement 104 is configured with a database 132 of article identifiers and associated data that identify owners of the articles. The database may further include data that indicate email addresses of the owners, telephone numbers of the owners, and mailing addresses of the owners.

In response to the identifier received from the handheld device, the owner-identifying data associated with the article identifier is read from the database 132. In one embodiment, that owner-identifying data is output so that the owner may be contacted. For example, an operator at computing arrangement 104 may use the information to contact the owner. In another embodiment, the owner may be contacted automatically by the computing arrangement, such as with an email or telephone message. In another embodiment, the owner-identifying information may be transmitted to the handheld device, and the handheld device may initiate communication with the owner.

In another embodiment, the system 100 provides protection for the owners of the articles by allowing only trusted finders to access the ownership information. The database 132 may be further configured with data that identify one or more trusted finders. The trusted finders may be managed with digital certificates, for example. The handheld device 102 transmits a finder identifier in association with each article identifier communicated to the computing arrangement 104. The computing arrangement determines whether or not the finder identifier matches any of the trusted finders in the database. In response to determining that the finder identifier matches one of the trusted finders, the computing arrangement transmits the owner-identifying data to the handheld device. In response to determining that the finder identifier does not match any of the trusted finders, the computing arrangement bypasses the transmitting of the owner-identifying data to the handheld device, either by returning an access denied message or ignoring the request, for example.

In the event that a recognized finder communicates with the computing arrangement, the lost-and-found repository may communicate with the owner and indicate that the article has been found or recovered by the party associated with the finder identifier. The owner may then arrange to communicate with the finder by means agreeable to both parties. In this scenario, the finder identifier may include finder-identifying data associated with the digital certificate. The finder-identifying data may include a name, organization, and telephone number, for example.

Computing arrangement 104 includes one or more processors 142 coupled to a memory/storage arrangement 144. The architecture of the computing arrangement depends on implementation requirements as would be recognized by those skilled in the art. The processor 142 may be one or more general purpose processors, or a combination of one or more general purpose processors and suitable co-processors, or one or more specialized processors (e.g., RISC, pipelined, etc.).

The memory/storage arrangement 144 is representative of hierarchical storage commonly found in computing arrangements. Such hierarchical storage typically includes multiple levels of cache memory, a main memory, and local and/or remote persistent storage, such as provided by magnetic disks (not shown). The memory/storage arrangement may include one or both of local and remote memory/storage, with remote storage being coupled to the processor arrangement via a local area network, for example.

The processor arrangement 142 executes the software stored in memory/storage arrangement 144, and reads data from and stores data to the memory/storage arrangement according to the processes described above. The software is shown as instructions 146. An operating system (not shown) manages the resources of the computing arrangement. Communications circuit 148 includes the components and circuitry for communicating via network 106. These include wired or wireless interfaces, for example.

Those skilled in the art will appreciate that various alternative computing arrangements, including one or more processors and a memory arrangement configured with program code, would be suitable for hosting the processes and data structures of the different embodiments. In addition, program code that implements the processes may be provided via a variety of computer-readable storage media or delivery channels such as magnetic or optical disks or tapes, electronic storage devices, or as application services over a network.

Figures 2, 3:
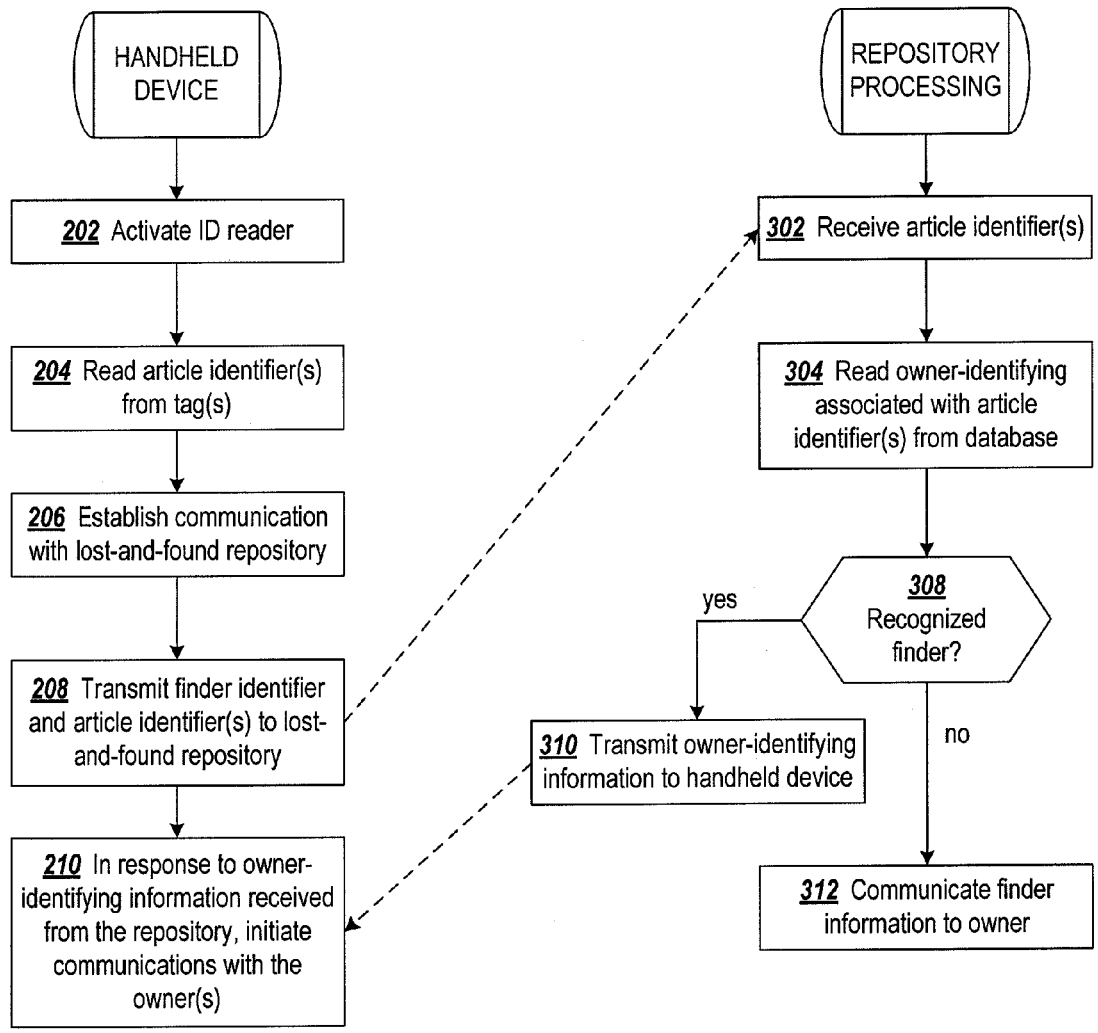
FIG. 2 is a flowchart of a process performed by a handheld computing device for reading an article identifier(s) from ID tag(s) attached to the article(s) and communicating with a lost-and-found repository having article identifiers and associated ownership information.
FIG. 3 is a flowchart of a process performed by a lost-and-found repository in determining ownership of an article identified by an article identifier and communicating ownership information.

FIG. 2 is a flowchart of a process performed by a handheld computing device for reading an article identifier(s) from an identification tag(s) and communicating with a lost-and-found repository having article identifiers and associated ownership information. At block 202, the ID reader of the handheld device is activated for reading identification tags. The activation may include, for example, starting a software function via touch screen or keypad, where the software function controls the RFID transceiver.

At block 204, the article identifiers or one or more articles are read from the attached ID tags. Once the handheld device has assembled the article identifier(s), communication is established with the lost-and-found repository at block 206. At block 208, the article identifier and a finder identifier are transmitted to the lost-and-found repository. Once the lost-and-found repository responds with owner-identifying information from the repository, the handheld device initiates communications with the owner(s) at block 210. The communication may be by email or telephone message and may include the article identifier and other descriptive information, along with information for contacting the finder.

FIG. 3 is a flowchart of a process performed by a lost-and-found repository in determining ownership of an article identified by an article identifier and communicating ownership information. At block 302, one or more article identifiers are received from a handheld device. At block 304, the owner-identifying information associated with the article identifier(s) is read from the database.

At decision block 308, the lost-and-found repository determines whether or not the finder identifier, which was communicated from the handheld device, is a recognized or trusted finder. If the finder is recognized or trusted, the owner-identifying information is transmitted to the handheld device at block 310. In some embodiments, the lost-and-found repository communicates with the owner of the article directly, and indicates the identity of the finder to the owner of the article. For an unrecognized or un-trusted finder, at block 312 the lost-and-found repository communicates with the owner of the article. The communication may entail providing any available information as to the identity of the finder to the owner so that the owner can choose whether or not to communicate with the finder to retrieve the article. It will be appreciated that the communications to the owner may be by email, telephone, text message, etc.

Figure 4:
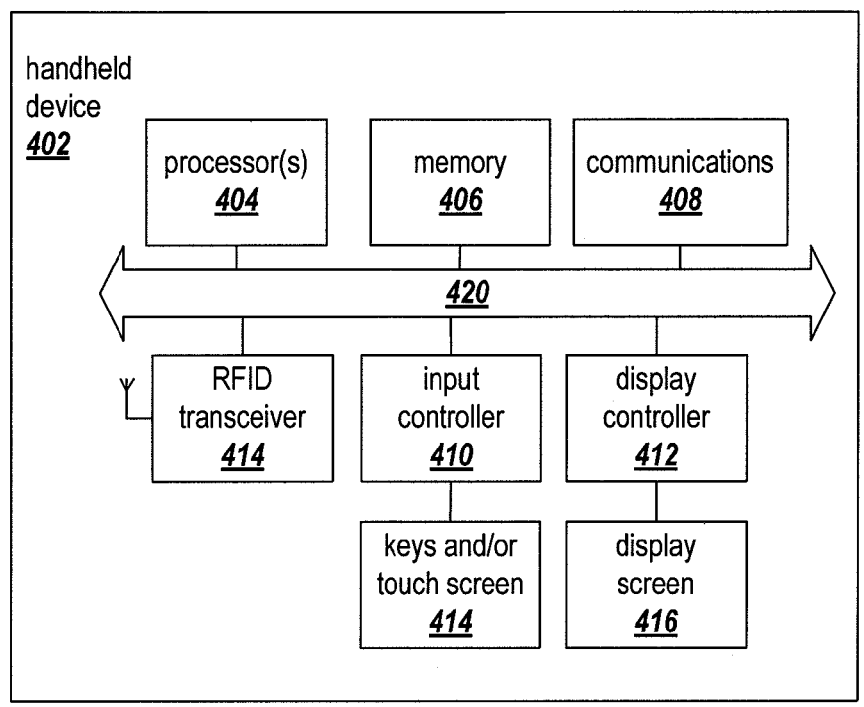
FIG. 4 is a diagram of an example handheld computing device configured in accordance with one or more embodiments of the invention.

FIG. 4 is a diagram of an example handheld computing device configured in accordance with one or more embodiments of the invention. The handheld device 402 includes one or more processors 404, a memory 406, a communications circuit 408, input and display controllers 410 and 412, and an RFID transceiver 414. The input controller is coupled to a keypad and/or a touch screen 414, and the display controller is coupled to a display screen 416. The various components are coupled via bus 420. The physical form of the handheld device may be that of a smartphone, a tablet computer, a dedicated mobile or a stationary RFID reader, for example. The processor 404 and RFID transceiver 414 together include the logic and circuitry for reading identification codes from one or more RFID tags and discriminating between the codes.

The memory 406 is configured with instructions that when executed by the processor 404 cause the processor to implement the processes described herein. The communications circuit 408 provides an interface for communicating with the lost-and-found repository via a network such as the Internet. The communications circuit may include interfaces for Wifi, Bluetooth, or telecommunications.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

Other aspects and embodiments of the present invention will be apparent to those skilled in the art from consideration of the specification and practice of the invention disclosed herein. It is intended that the specification and illustrated embodiments be considered as examples only, with a true scope of the invention being indicated by the following claims.

What is claimed is:

1. A system for aiding in recovery of lost articles, comprising
a computing arrangement configured with a database that contains article identifiers of a plurality of articles and associated data that identify owners of the articles;
wherein the database is further configured with data that identify a plurality of trusted finders;
a handheld computing device configured with instructions that, when executed by the handheld computing device, cause the computing device to perform operations including:
reading an article identifier from an identification tag attached to an article;
transmitting the article identifier to the computing arrangement; and
transmitting a finder identifier in association with the article identifier to the computing arrangement;
wherein the computing arrangement is further configured with instructions that when executed by the computing arrangement cause the computing arrangement to perform operations including:
reading the data associated with the identifier that identifies the owner of the article in response to the identifier received from the handheld computing device;
determining whether or not the finder identifier matches any of the trusted finders;
in response to determining that the finder identifier matches one of the trusted finders, transmitting the data that identifies the owner to the handheld computing device; and
in response to determining that the finder identifier does not match any of the trusted finders, bypassing transmitting of the data that identifies the owner to the handheld computing device.

2. The system of claim 1, wherein the data that identify owners of the articles further includes data that indicate email addresses of the owners.

3. The system of claim 1, wherein the data that identify owners of the articles further includes data that indicate telephone numbers of the owners.

4. The system of claim 1, wherein the data that identify owners of the articles further includes data that indicate mailing addresses of the owners.

5. The system of claim 1, wherein the operations of the handheld computing device further include initiating communication with the owner in response to receiving the data that identifies the owner.

6. The system of claim 1, wherein the operations of the computing arrangement further include, in response to determining that the finder identifier does not match any of the trusted finders, initiating communication with the owner.

7. The system of claim 6, wherein the initiating communication with the owner by the computing arrangement includes communicating the finder identifier to the owner.

8. The system of claim 1, wherein the identification tag is an RFID tag.

9. The system of claim 1, wherein the identification tag is a barcode tag.

10. A method for aiding in recovery of lost articles, comprising
    reading with a handheld computing device an article identifier from an identification tag attached to an article;
    transmitting the article identifier from the handheld computing device to a computing arrangement, wherein the computing arrangement is configured with a database that contains article identifiers of a plurality of articles and associated data that identify owners of the articles;
    wherein the database is further configured with data that identify a plurality of trusted finders;
    transmitting a finder identifier in association with the article identifier from the handheld computing device to the computing arrangement;
    reading from the database by the computing arrangement in response to the article identifier received from the handheld computing device, data that is associated with the article identifier and that identifies the owner of the article;
    determining by the computing arrangement whether or not the finder identifier matches any of the trusted finders; and
        in response to determining that the finder identifier matches one of the trusted finders, transmitting the data that identifies the owner from the computing arrangement to the handheld computing device; and
        in response to determining that the finder identifier does not match any of the trusted finders, bypassing transmitting of the data that identifies the owner to the handheld computing device.

11. The method of claim 10, wherein the data that identifies the owner of the article includes data that indicates an email address of the owner.

12. The method of claim 10, wherein the data that identifies the owner of the article includes data that indicates a telephone number of the owner.

13. The method of claim 10, wherein the data that identifies the owner of the article includes data that indicates a mailing address of the owner.

14. The method of claim 10, further comprising initiating communication by the handheld computing device with the owner in response to receiving the data that identifies the owner.

15. The method of claim 10, further comprising, in response to determining that the finder identifier does not match any of the trusted finders, initiating communication by the computing arrangement with the owner.

16. The method of claim 15, wherein the initiating communication with the owner by the computing arrangement includes communicating the finder identifier to the owner.

17. The method of claim 10, wherein the reading of the article identifier with the handheld computing device includes reading from an RFID tag.

18. The method of claim 10, wherein the reading of the article identifier with the handheld computing device includes reading from a barcode tag.

19. A system for aiding in recovery of lost articles, comprising
    a computing arrangement configured with a database that contains article identifiers of a plurality of articles and associated data that identify owners of the articles;
    wherein the database is further configured with data that identify a plurality of trusted finders;
    a handheld computing device configured with instructions that, when executed by the handheld computing device, cause the computing device to perform operations including:
        reading an article identifier from an identification tag attached to an article;
        transmitting the article identifier and an associated finder identifier to the computing arrangement; and
    wherein the computing arrangement is further configured with instructions that when executed by the computing arrangement cause the computing arrangement to perform operations including:
        reading the data associated with the identifier that identifies the owner of the article in response to the identifier received from the handheld computing device;
        determining whether or not the finder identifier matches any of the trusted finders; and
        in response to determining that the finder identifier does not match any of the trusted finders, initiating communication with the owner.

20. The system of claim 19, wherein the computing arrangement is further configured with instructions that cause the computing arrangement to perform operations including:
    in response to determining that the finder identifier matches one of the trusted finders, transmitting the data that identifies the owner to the handheld computing device; and
    in response to determining that the finder identifier does not match any of the trusted finders, bypassing transmitting of the data that identifies the owner to the handheld computing device.

21. The system of claim 19, wherein the initiating communication with the owner by the computing arrangement includes communicating the finder identifier to the owner.

22. A method for aiding in recovery of lost articles, comprising
    reading with a handheld computing device an article identifier from an identification tag attached to an article;
    transmitting the article identifier and an associated finder identifier from the handheld computing device to a computing arrangement, wherein the computing arrangement is configured with a database that contains article identifiers of a plurality of articles and associated data that identify owners of the articles and with data that identify a plurality of trusted finders;
    reading from the database by the computing arrangement in response to the article identifier received from the handheld computing device, data that is associated with the article identifier and that identifies the owner of the article;
    determining by the computing arrangement whether or not the finder identifier matches any of the trusted finders; and
    in response to determining that the finder identifier does not match any of the trusted finders, initiating communication by the computing arrangement with the owner.

23. The method of claim 22, further comprising:
    in response to determining that the finder identifier matches one of the trusted finders, transmitting the data that identifies the owner from the computing arrangement to the handheld computing device; and in response to determining that the finder identifier does not match any of the trusted finders, bypassing transmitting of the data that identifies the owner to the handheld computing device.

24. The method of claim 22, wherein the initiating communication with the owner by the computing arrangement includes communicating the finder identifier to the owner.

* * * * *